United States Patent [19]
Jain et al.

[11] Patent Number: 6,061,781
[45] Date of Patent: May 9, 2000

[54] CONCURRENT EXECUTION OF DIVIDE MICROINSTRUCTIONS IN FLOATING POINT UNIT AND OVERFLOW DETECTION MICROINSTRUCTIONS IN INTEGER UNIT FOR INTEGER DIVIDE

[75] Inventors: Dinesh K. Jain, Austin; Albert J. Loper, Jr., Cedar Park; Arturo Martin-de-Nicolas, Austin, all of Tex.

[73] Assignee: IP First LLC, Fremont, Calif.

[21] Appl. No.: 09/108,945

[22] Filed: Jul. 1, 1998

[51] Int. Cl.[7] ........................................... G06F 7/52
[52] U.S. Cl. .................... 712/221; 708/552; 708/650; 708/655
[58] Field of Search .................. 708/552, 650, 708/655; 712/221

[56] References Cited

U.S. PATENT DOCUMENTS 4,992,969  2/1991  Yamahata .................. 708/650
5,272,660  12/1993  Rossbach .................. 708/504

*Primary Examiner*—Kenneth S. Kim
*Attorney, Agent, or Firm*—Richard K. Huffman; James W. Huffman

[57] ABSTRACT

An apparatus and method for performing integer division in a microprocessor are provided. The apparatus includes translation logic, floating point execution logic, and integer execution logic. The translation logic decodes an integer divide instruction into an integer divide micro instruction sequence and an overflow detection micro instruction sequence. The integer divide micro instruction sequence is routed to and executed by the floating point execution logic. The overflow detection micro instruction sequence is routed to and executed by the integer execution logic. The integer execution logic and the floating point execution logic execute the overflow detection micro instruction sequence and the integer divide micro instruction sequence concurrently.

28 Claims, 6 Drawing Sheets

Conventional Approach to Integer Division

FIG. 4 (Related Art)

*Conventional Integer Divide Within Floating Point Unit*

32-Bit Dividend
16-Bit Divisor

| Cycle | Translate | FP Register | FP Execute |
|-------|-----------|-------------|------------|
| 1 | *** | *** | *** |
| 2 | IDIV BX | *** | *** |
| 3 | *** | LD F1,DX:AX | *** |
| 4 | *** | LD F2,BX | LD F1,DX:AX |
| 5 | *** | IDIV F1,F2 | LD F2,BX |
| 6 | *** | OV(1) F1,F2 | IDIV F1,F2 |
| 7 | -- | -- | IDIV F1,F2 |
| 8 | -- | -- | IDIV F1,F2 |
| 9 | -- | -- | IDIV F1,F2 |
| 65 | -- | -- | IDIV F1,F2 |
| 66 | -- | -- | IDIV F1,F2 |
| 67 | -- | -- | IDIV F1,F2 |
| 68 | -- | -- | IDIV F1,F2 |
| 69 | -- | -- | IDIV F1,F2 |
| 70 | *** | OV(2) F1,F2 | OV(1) F1,F2 |
| 71 | *** | OV(3) F1,F2 | OV(2) F1,F2 |
| 72 | *** | OV(4) F1,F2 | OV(3) F1,F2 |
| 73 | *** | OV(5) F1,F2 | OV(4) F1,F2 |
| 74 | *** | *** | OV(5) F1,F2 |
| 75 | *** | *** | *** |

64 CYCLES (FIXED) TO DIVIDE

5 CYCLES (TYP.) TO DETECT OVERFLOW

*Method for Integer Division with Parallel Overflow Detection*

CONCURRENT EXECUTION OF DIVIDE MICROINSTRUCTIONS IN FLOATING POINT UNIT AND OVERFLOW DETECTION MICROINSTRUCTIONS IN INTEGER UNIT FOR INTEGER DIVIDE

BACKGROUND OF THE INVENTION

1. Field of the Invention

This invention relates in general to the field of data processing in computers, and more particularly to an apparatus and method for performing integer division.

2. Description of the Related Art

Software programs that execute on a microprocessor consist of macro instructions that together direct the microprocessor to perform a function. Each macro instruction directs the microprocessor to perform a specific operation that is part of the function such as loading data from memory, storing data in a register, or adding the contents of two registers.

A macro instruction may prescribe a simple operation, such as moving the contents of one register location to another register location. In contrast, a different macro instruction may prescribe a complex operation, such as deriving the cosine of a floating point number. Compared to the manipulation of integer data, the manipulation of floating point data by the microprocessor is complex and time consuming. Movement of integer data requires only a few cycles of a microprocessor clock; derivation of a cosine requires hundreds of machine cycles. Because floating point operations are basically more complex than integer operations, typical microprocessors employ a dedicated floating point unit to improve the speed and efficiency of floating point calculations. The dedicated floating point unit may be part of the same mechanical package as the remainder of the microprocessor or it may reside in a separate mechanical package.

Within an x86-compatible microprocessor, a floating point macro instruction is decoded into a sequence of floating point micro instructions that direct the microprocessor to execute a floating point operation. The sequence of floating point micro instructions is passed to the floating point unit. The floating point unit executes the sequence of floating point micro instructions and provides a result of the floating point operation in a result register. Likewise, an integer macro instruction is decoded into a sequence of integer micro instructions that direct the microprocessor to execute an integer operation. The sequence of integer micro instructions is passed to the integer unit. The integer unit executes the sequence of integer micro instructions and provides a result of the integer operation in a result register.

In recent years, advances in integrated circuit design and manufacturing technologies have allowed designers to add increasingly more functionality to a microprocessor. More functions are added by simply adding more logic circuits to a device. Additional functions, in this sense, often result in a greater power requirement, which is inversely proportional to device reliability. Consequently, microprocessor designers are now searching for alternative ways to add functions to a device. Designers now use existing logic to perform new functions, or they eliminate redundant logic and redistribute existing functions to remaining logic. One example of redistribution is seen in the implementation of logic to perform integer division.

Early microprocessors maintained separate dividers. A divider in an integer unit was dedicated to performing integer division and another divider in a floating point unit was used to perform floating point division. Recognizing that these dividers were essentially equivalent logic circuits, designers of present day microprocessor have eliminated the divider in the integer unit and have redistributed the integer division function so that it is now executed in the floating point unit.

Redistribution of the integer division function to a floating point divider, however, results in slower execution times for integer division instructions This is because a typical floating point divider is designed to operate on fixed-length operands. More specifically, the typical floating point divider expects to receive 64-bit operands, it requires approximately 64 cycles of the microprocessor clock to perform division, and it provides a 64-bit result. But, integer division in an x86-compatible microprocessor allows operands much smaller than 64-bits.

Additionally, for integer division, x86 architectural provisions restrict the size of a divisor and a quotient to be one-half the size of a dividend. As a result, to perform x86-compatible integer division in a 64-bit floating point divider requires initial alignment of the divisor and dividend in the divider and execution of a number of unnecessary divide cycles in the divider. A division which would result in a quotient that exceeds the size restriction causes a divide overflow condition. Hence, in addition to having to execute unnecessary divide cycles in the divider, floating point execution logic is also required to execute an operation to detect the divide overflow condition, the operation either immediately preceding or immediately following the integer division.

A consequence of using an existing 64-bit floating point divider to perform integer division is that an integer divide instruction, regardless of its operand sizes, requires 64 cycles to execute, plus a number of cycles to detect for a divide overflow. A majority of the cycles are not required. The cycles associated with detection of divide overflow are not essential to the division operation itself.

Attempts in the art are prevalent to increase the execution speed of an integer divide instruction. The Pentium® processor uses a technique called SRT division. At a high level, while execution speed is improved, implementation of SRT division requires the addition of complex and costly logic to a microprocessor. Other microprocessors have added hardware which is dedicated to performing detection of a divide overflow. As with the Pentium, dedicated hardware for overflow detection speeds up execution time for an integer divide instruction, but again, additional logic circuits are required. Both of these attempts to increase speed are a return to a design doctrine where power, design complexity, and cost are allowed to grow. One skilled in the art will appreciate that performance improvement for a given instruction in a microprocessor, where the improvement is gained without a requirement for additional hardware, is highly desirable.

Therefore, what is needed is an apparatus for performing integer division in a microprocessor that does not require complex additional hardware to execute the division or to detect a divide overflow.

In addition, what is needed is a microprocessor that executes an integer divide instruction in a specified number of divide cycles.

Furthermore, what is needed is a method for performing integer division in a microprocessor that requires neither additional clock cycles nor dedicated hardware to detect for a divide overflow.

SUMMARY

To address the above-detailed deficiencies, it is an object of the present invention to provide an apparatus in a microprocessor for performing integer division and overflow detection in parallel execution units.

Accordingly, in the attainment of the aforementioned object, it is a feature of the present invention to provide a microprocessor for performing integer division. The microprocessor includes translation logic, floating point execution logic, and integer execution logic. The translation logic receives an integer divide instruction and decodes the integer divide instruction into an associated micro instruction sequence. The associated micro instruction sequence has an integer divide micro instruction sequence and an overflow detection micro instruction sequence. The integer divide micro instruction sequence prescribes the integer division of a dividend by a divisor. The overflow detection micro instruction sequence determines if execution of the integer divide micro instruction sequence will result in an overflow. The floating point execution logic is coupled to the translation logic and receives and executes the integer divide micro instruction sequence. The integer execution logic is coupled to the translation logic and receives and executes the overflow detection micro instruction sequence. The integer execution logic and the floating point execution logic execute the overflow detection micro instruction sequence and the integer divide micro instruction sequence concurrently.

An advantage of the present invention is that unessential cycles for performing overflow detection are eliminated from the integer divide execution path.

Another object of the present invention is to provide a microprocessor that does not require additional hardware to perform integer division or overflow detection.

In another aspect, it is a feature of the present invention to provide an apparatus in a microprocessor for executing an integer division. The apparatus includes translation logic, floating point execution logic, and integer execution logic. The translation logic receives an integer divide instruction and generates an associated micro instruction sequence that directs the microprocessor to perform the integer division and to detect an overflow condition. The translation logic includes routing logic. The routing logic routes the micro instructions within the associated micro instruction sequence. The floating point execution logic is coupled to the translation logic and receives and executes micro instructions prescribing the integer division. The integer execution logic is coupled to the translation logic and receives and executes micro instructions prescribing detection of the overflow condition.

In yet another aspect, it is a feature of the present invention to provide an apparatus in a microprocessor for executing an integer divide instruction that prescribes a dividend and a divisor. The apparatus includes a translator, routing logic, floating point execution logic, and integer execution logic. The translator decodes the integer divide instruction into an associated micro instruction sequence. The associated micro instruction sequence includes an integer divide micro instruction sequence and an overflow detection micro instruction sequence. The integer divide micro instruction sequence specifies a number of divide cycles according to the size of the divisor. The overflow detection micro instruction sequence determines if execution of the integer divide micro instruction sequence will result in an overflow. The routing logic is coupled to the translator and receives the integer divide micro instruction sequence and the overflow detection micro instruction sequence. The routing logic also routes the sequences. The floating point execution logic is coupled to the routing logic and receives the integer divide micro instruction sequence. The floating point execution logic also performs the integer division for the specified number of divide cycles. The integer execution logic is coupled to the routing logic and receives and executes the overflow detection micro instruction sequence.

Another advantage of the present invention is that integer division only requires a number of divide cycles commensurate with the size of the division operands.

Yet another object of the present invention is to provide a method for performing integer division in a microprocessor which executes overflow detection in parallel with the integer division.

In a further aspect, it is a feature of the present invention to provide a method for performing integer division in a microprocessor having parallel execution units. The method includes decoding an integer divide instruction into an associated micro instruction sequence, the associated micro instruction sequence having an integer divide micro instruction sequence and an overflow detection micro instruction sequence, wherein the integer divide micro instruction sequence specifies a number of divide cycles according to the size of a divisor; and concurrently executing the overflow detection micro instruction sequence and the integer divide micro instruction sequence within the parallel execution units.

Yet another advantage of the present invention is that execution performance of an integer divide instruction is improved without sacrificing power, device complexity, or cost.

BRIEF DESCRIPTION OF THE DRAWINGS

These and other objects, features, and advantages of the present invention will become better understood with regard to the following description, and accompanying drawings where:

FIG. 4 is a table illustrating execution of an integer divide instruction by the microprocessor of FIG. 3.

DETAILED DESCRIPTION

In light of the above background on techniques for performing integer division in a microprocessor, several related art examples will now be described with reference to FIGS. 1 through 4. These examples illustrate the problematic nature of present day integer division techniques when employed in an x86-compatible microprocessor. Following this discussion, a detailed description of the present invention will be provided with reference to FIGS. 4 through 6. Use of the present invention allows integer division to be performed using existing floating point hardware in a microprocessor without incurring timing delays related to its use.

Figure 1:
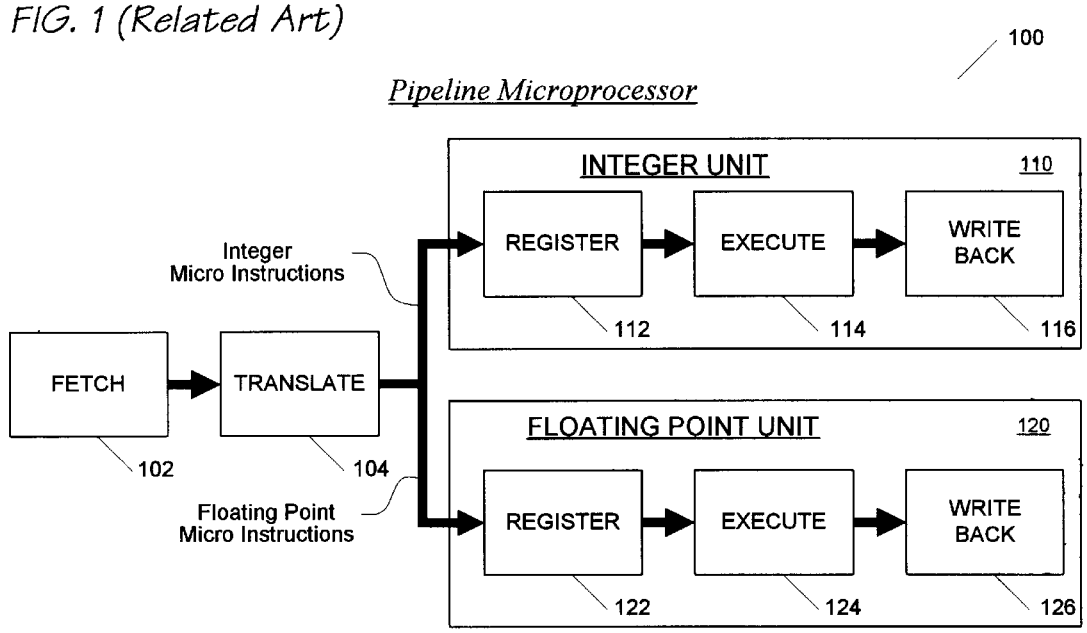
FIG. 1 is a block diagram of pipeline microprocessor featuring parallel execution units.

Referring to FIG. 1, a block diagram of a related art pipeline microprocessor 100 is presented. The microprocessor 100 includes a fetch stage 102, a translate stage 104, an integer unit 110, and a floating point unit 120. The floating point unit 120 is in parallel with the integer unit 110. The integer unit 110 has three stages: register 112, execute 114, and write back 116. The floating point unit 120 has three like stages: register 122, execute, 124, and write back 126.

Operationally, the fetch stage 102 fetches macro instructions from memory (not shown) for execution by the microprocessor 100. The translate stage 104 translates, or decodes, a fetched macro instruction into associated micro instructions, each directing the microprocessor to perform a specific subtask related to accomplishment of an higher level operation, which is specified by the fetched macro instruction. Because of fundamental differences between operations involving integers and operations involving floating point numbers, microprocessor designers have historically segregated hardware and associated macro instructions for the performance of integer subtasks from that required to perform floating point subtasks.

Thus, the translate stage 104 decodes a floating point macro instruction into a sequence of floating point micro instructions to accomplish a specified floating point operation. Likewise, the translate stage 104 decodes an integer macro instruction into a sequence of integer micro instructions to accomplish a specified integer operation. The integer micro instructions are passed from the translate stage 104 to the integer unit register stage 112. The integer unit register stage 112 retrieves operands specified by the integer micro instructions from a register file (not shown) for use by later stages in the integer pipeline. The integer unit execute stage 114 executes subtasks specified by the integer micro instructions. Examples of subtasks performed by the execute stage 114 include address calculation, integer arithmetic, and retrieval/storage of data from/to memory. The integer unit write back stage 116 writes results of the executed subtasks back into the register file.

Likewise, the floating point micro instructions are passed from the translate stage 104 to the floating point unit register stage 122. The floating point unit register stage 122 retrieves operands prescribed by the floating point micro instructions from a floating point register file (not shown), for use by later stages in the floating point pipeline. The floating point unit execute stage 124 executes floating point subtasks specified by the floating point micro instructions. Examples of subtasks performed by the floating point execute stage 124 include floating point arithmetic, square root, and transcendental functions (i.e., sine, cosine, etc.). The floating point unit write back stage 126 writes results of the executed subtasks back into the floating point register file.

Micro instructions move through successive stages of the microprocessor pipeline in synchronization with a microprocessor clock. Optimally, while any given stage in the pipeline is executing a micro instruction, the previous stage should be executing the next, or following, micro instruction. If a preceding micro instruction within one stage requires more than one cycle to completely execute, then following micro instructions are stalled until execution of the preceding micro instruction is completed. When a stall occurs, pipeline slips are inserted into the pipeline to insure that the following micro instructions do not prematurely advance in the pipeline.

In contrast to the integer unit 110, the floating point unit 120 has complex computational logic that is dedicated to performing intensive floating point data manipulations. For example, addition of two integers takes roughly one cycle of a microprocessor clock in the integer unit 110 while execution of a cosine operation takes hundreds of clock cycles in the floating point unit 120. Although the translate stage 104 issues micro instructions serially to the integer unit 110 and the floating point unit 120, because the units 110, 120 are in parallel, they can execute micro instructions at the same time. More specifically, while the floating point unit 120 is executing the micro instructions related to the cosine operation, the integer unit 110 may also execute related micro instructions.

These examples serve to point out the computing extremes that distinguish operations relegated to floating point hardware 120 from those which are relegated to integer hardware 110. Yet, there are operations which are moderately complex, and are thus only reasonably difficult to accomplish in a microprocessor. Integer division is such an operation.

Figure 2:
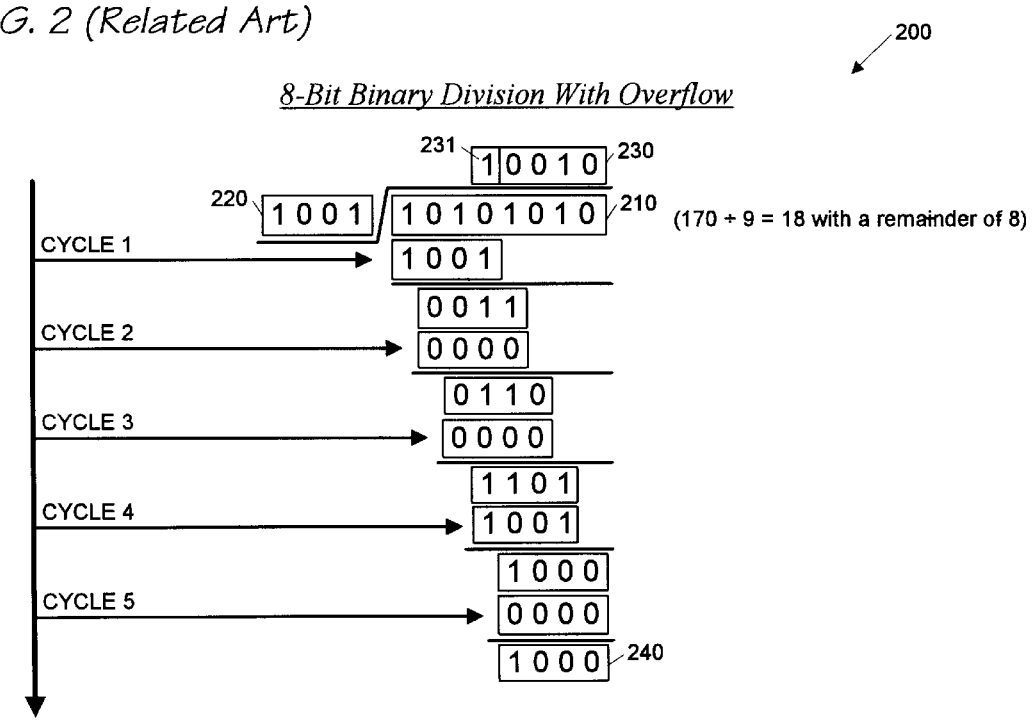
FIG. 2 is a diagram illustrating integer division of an 8-bit dividend by a 4-bit divisor.

Now referring to FIG. 2, a diagram 200 is presented illustrating longhand integer division of an 8-bit binary dividend 210 by a 4-bit binary divisor 220. The result of the division is a quotient 230 along with a remainder 240. Longhand binary division is accomplished by a series of comparisons, subtractions, and shifts. Each cycle within the series represents one instance of a compare-subtraction-shift operation.

During cycle 1, the divisor 220 is compared to the most significant four bits of the dividend 210. Because 1001 is less than or equal to 1010, a 1 is marked as the most significant bit in the quotient 230. Hence, 1001 is subtracted from 1010 to yield a result of 001. The cycle completes as consideration is shifted to a next lower bit, a 1. The 1 is appended to the result to yield 0011.

During cycle 2, the divisor 220 is compared to 0011. Because 1001 is greater than 0011, a 0 is marked in a next lower bit position in the quotient. Hence, 0000 is subtracted from 0011 to yield a result of 011. Cycle 2 completes as consideration is shifted to a next lower bit, a 0. The 0 is appended to the result to yield 0110.

Cycle 3 begins by comparing the divisor 220 to 0110. Because 1001 is greater than 0110, a 0 is marked in a next lower bit position in the quotient. Hence, 0000 is subtracted from 0110 to yield a result of 110. Cycle 3 completes as consideration is shifted to a next lower bit, a 1. The 1 is appended to the result to yield 1101.

Cycle 4 begins by comparing the divisor 220 to 1101. Because 1001 is less than 1101, a 1 is marked in a next lower bit position in the quotient. Hence, 1001 is subtracted from 1101 to yield a result of 100. Cycle 4 completes as consideration is shifted to a next lower bit, a 0. The 1 is appended to the result to yield 1000.

Cycle 5 begins by comparing the divisor 220 to 1000. Because 1001 is greater than 1000, a 0 is marked in the least significant bit position in the quotient. Hence, 0000 is subtracted from 1000 to yield a result of 1000, which is the remainder 240. At this point, the division operation is complete.

Conventional integer division in a microprocessor is accomplished in very much the same manner as longhand division. The dividend 210 and divisor 220 are placed in registers within a binary divider, i.e., a logic device dedicated to performing binary division. Following this, a series of compare-subtraction-shift operations are executed as described above, where each cycle of the division operation requires approximately one cycle of the pipeline clock to execute. Diverse implementations of conventional binary dividers exist today, however, they all employ variations of the compare-subtraction-shift methodology described above. For this reason, it is customary for those skilled in the art to compare binary dividers in terms of the number of cycles that are required for execution.

Another point is relevant with respect to FIG. 2: The quotient 230 has five significant digits. The most significant digit 231 in the quotient is 1 because the initial comparison during cycle 1 determined that the divisor was less than the four most significant bits of the dividend 210. With regard to longhand binary division, such an observation is unnecessary, because as many bits as are required for representation of the quotient 230 may be used. Yet, in an x86-compatible microprocessor, the size of a quotient is restricted by architectural standards to be the size of a divisor. Hence, because the size of the quotient 230 (five bits) in FIG. 2 is greater than the size of the divisor 220 (four bits), in an x86-compatible microprocessor, the division operation would cause a divide overflow, also known as an overflow. The reasons for restriction of the size of the quotient 230 in an x86-compatible microprocessor are beyond the scope of this paper, however, it suffices to note that early binary dividers exhibited the same restriction. Moreover, this restriction does not imply that a divide overflow will preclude an x86-compatible microprocessor from performing a division operation; it merely implies that means other than a conventional binary divider in a microprocessor must be utilized to accomplish the division.

As a result of the restriction on the size of the quotient, an x86-compatible microprocessor must additionally perform a series of subtasks to detect whether an integer division exhibits an overflow, in other words, whether the quotient is a correct result for the integer division. Various techniques are used today to detect divide overflow. One technique uses a standard register size, say 32-bits, to store the dividend 210, divisor 220, quotient 230, and remainder 240. The divisor 220 is justified into its register. Following this, the integer division is performed for a fixed number of divide cycles, the number of cycles being equal to the standard register size. After the division is performed, the quotient register is evaluated to determine if it contains more significant bits than are allowed. If so, then a divide overflow has occurred.

Early binary logic texts present a second technique to determine overflow: the divisor 220 is compared to the most significant bits of the dividend 210. If the divisor 220 is less than or equal to the most significant bits of the dividend 210, then there is a divide overflow. More specifically, for a 32-bit dividend with a 16-bit divisor, if the 16-bit divisor is less than or equal to the upper half of the 32-bit dividend, then use of the second technique determines that a quotient cannot be represented by 16-bits.

Like conventional binary dividers, divide overflow detection mechanisms vary in microprocessors. Some microprocessors employ dedicated hardware to detect overflow. Other microprocessors employ a sequence of dedicated micro instructions which either immediately precede or follow micro instructions for the integer divide.

One skilled in the art will appreciate that several design attributes of a microprocessor weigh heavily with regard to desktop computer applications: speed must be maximized; power consumption and cost must be minimized. In many cases, though, optimization of one of the above attributes only comes at the expense of one or more of the remaining attributes being out of balance. For instance, to maximize the speed of an integer divide operation, the Pentium uses a technique known as SRT division. In essence, SRT division determines more than one digit of a quotient during a single divide cycle. This is accomplished by indexing an extensive table of partial quotient digits with parts of a divisor and a partial remainder. The table size is approximately 2,048 bytes. This table, dedicated only to division, incurs cost in terms of increased power consumption, increased manufacturing cost, and increased design complexity. Thus, power and cost are sacrificed in order to achieve a faster execution time for division.

Other microprocessors use less complex hardware to perform integer division. As alluded to with reference to FIG. 1, an integer divide is an operation which is only moderately complex. For this reason, some microprocessors employ a dedicated, fixed-length, binary divider within their integer execution units. Regardless of operand size, the fixed-length binary divider justifies divisor and dividend operands and performs the division for a fixed number of divide cycles. To more particularly illustrate, a 32-bit binary divider would require approximately 32 divide cycles to divide a 16-bit divisor into a 32-bit dividend. The same number of cycles would be required to divide an 8-bit divisor into a 16-bit dividend. In addition to micro instructions directing the division, a micro instruction sequence to detect for divide overflow would precede or follow. The overflow detection micro instruction sequence would be also be executed in the integer execution unit. Although the fixed-length binary divider in an integer execution unit is uses less complex hardware than the SRT division approach, it nevertheless presents additional power, complexity, and cost to the overall design. Again, the hardware is dedicated only to performing integer division.

A more common approach to performing integer division is to utilize existing floating point unit hardware. One skilled in the art will appreciate that a 64-bit divider in a floating point execution unit can be easily employed to perform integer division. At the x86 instruction level, it is made to appear that integer divides are being performed in an integer unit, however, micro instructions produced by a translator actually route integer division operands to the 64-bit divider in the floating point execution unit to perform the division operation. But, like the 32-bit divider discussed above, the 64-bit divider is a fixed-length divider, that is, 64 cycles are required to perform division of any allowable length. In addition to micro instructions directing the division, a micro instruction sequence is also generated to detect for divide overflow. This micro instruction sequence is executed in the floating point execution unit either immediately preceding or subsequent to the division. Performing integer division in existing floating point unit hardware is more specifically described with reference to FIG. 3.

Figure 3:
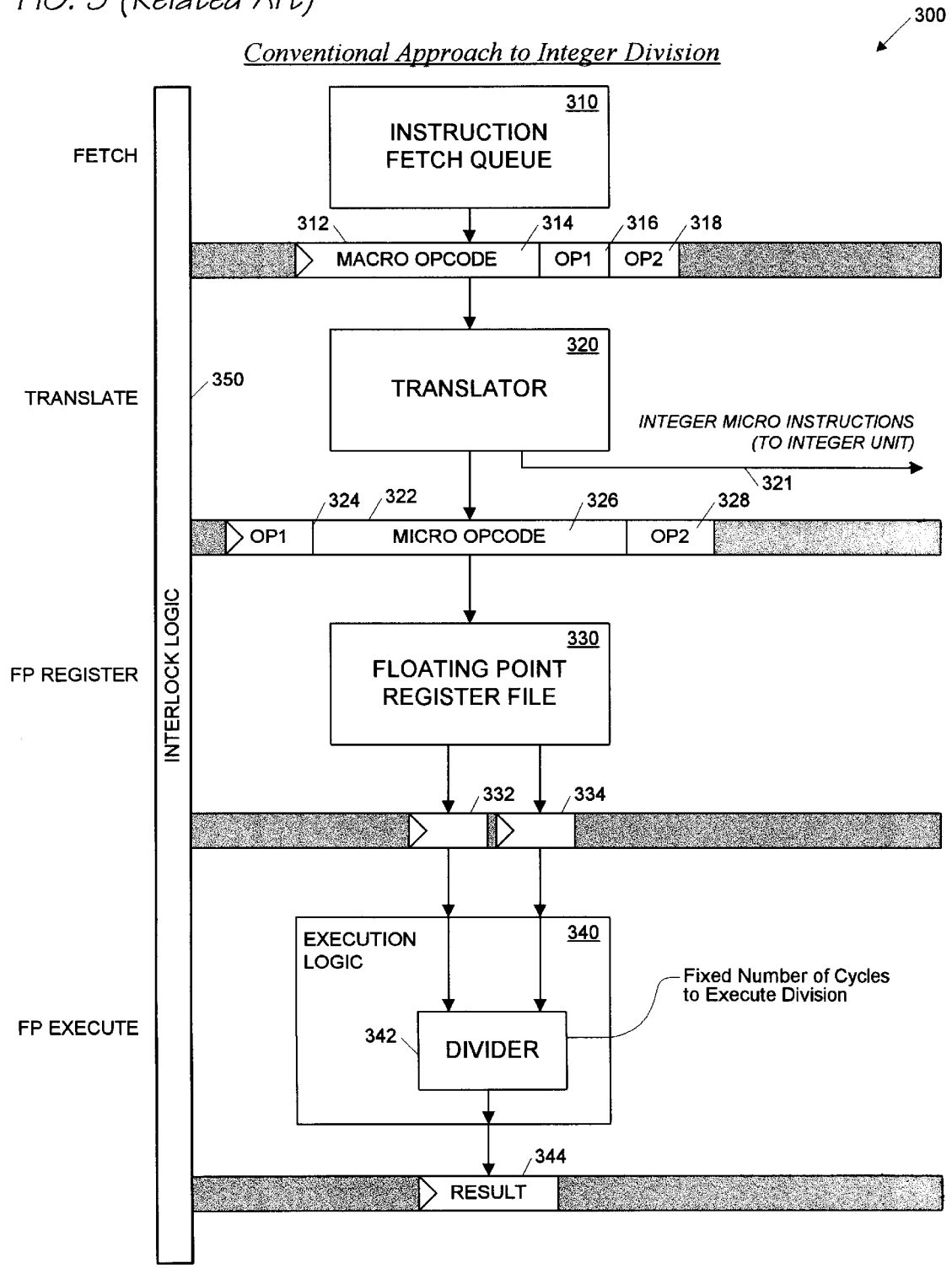
FIG. 3 is a block diagram of a floating point pipeline path in a related art microprocessor.

FIG. 3 is, a block diagram of a portion of a related art microprocessor 300 illustrating pipeline stages associated with execution of an integer divide instruction. For clarity, integer stages of the microprocessor 300 are not shown because they are not relevant to this discussion. The block diagram shows four pipeline stages associated with execution of the integer divide instruction: fetch, translate, floating point register, and floating point execute. A floating point write back stage is not shown because it also is not relevant to this discussion. Although a specific microprocessor may segregate its floating point unit differently into slightly more or less stages, one skilled in the art, nonetheless, will appreciate that the stages shown in FIG. 3 are representative of a typical microprocessor 300. The microprocessor 300 also includes interlock logic 350.

The fetch stage has an instruction fetch queue 310 connected to an instruction buffer 312. The translate stage has a translator 320 that provides an output to a floating point micro instruction buffer 322. The register stage has a floating point register file 330. Outputs of the floating point register file 330 are provided to first and second floating point operand registers 332, 334. The floating point execute stage includes floating point execution logic 340, which receives inputs from the first and second operand registers 332, 334. The floating point execution logic 340 includes a divider 342 and provides its output to a floating point result register 344. The contents of the result register 344 are provided to the write back stage so that they may be written back into the floating point register file 330 when a micro instruction completes execution.

In operation, the instruction fetch queue 310 fetches macro instructions from memory (not shown) for execution by the microprocessor 300. The macro instructions are sequentially provided to the instruction buffer 312. The instruction buffer 312 has three fields: a macro opcode field 314, a first macro operand field 316, and a second macro operand field 318. In the case of an integer divide macro instruction, the macro opcode field 314 directs the microprocessor 300 to divide a dividend, which has been previously stored in an architecturally defined register, by a divisor. The divisor is prescribed by the first macro operand field 316 to be either in a register or in memory. Additionally, the macro opcode field 214 specifies the dividend/divisor size: word/byte, doubleword/word, or quadword/doubleword. The second macro operand field 318 does not contain an operand in the case of an integer divide instruction.

The translator 320 retrieves a macro instruction from the macro instruction buffer 312 and decodes it into an associated sequence of micro instructions. Micro instructions directed to the integer unit (not shown) are provided on bus 321. Micro instructions directed to the floating point unit are provided to the floating point micro instruction buffer 322. The floating point micro instruction buffer 322 has three fields. Contents of a micro opcode field 326 direct the floating point unit to perform a specific subtask. Operands are provided in first and second micro operand fields 324, 328. In the case of an integer divide instruction, the micro operand fields 324, 328 would first contain dividend and divisor data to load in the floating point register file 330 and would thereafter contain references to specific registers in the floating point register file 330 for execution of the division. Thus, micro instructions are provided to the floating point unit of the microprocessor 300.

If the micro opcode so directs, contents of the floating point register file 330 are retrieved and placed into the first and second operand registers 332, 334. In the case of a divide instruction, the divisor and dividend, placed into the floating point register file 330 by preceding micro instructions, are retrieved and placed into the first and second operand registers 332, 334.

The floating point execution logic 340 retrieves the contents of registers 332 and 334 and executes the subtask specified by the micro opcode. For an integer divide instruction, the divisor and dividend are retrieved from registers 332 and 334 and provided to the divider 342. Following this, the divide operation is executed for a fixed number of cycles; 64 cycles is common to present day dividers. At the completion of the division, a result is placed in the result register 344. Either immediately preceding or subsequent to the actual division, the floating point execution logic must execute associated micro instructions to detect for divide overflow. For overflow detection, the associated micro instructions would instruct the floating point execution logic 340 to retrieve the divisor and dividend registers 332 and 334 and to compare the upper half of the divided to the divisor as described earlier.

Because the division operation requires 64 cycles of the divider 342, the interlock logic 350 inserts slips into the pipeline to preclude following instructions from prematurely advancing in the pipeline. Execution of an x86 integer divide instruction is more clearly illustrated with reference to FIG. 4.

FIG. 4 is a table 400 illustrating execution of an integer divide instruction by the microprocessor 300 of FIG. 3. The integer divide instruction is designated by IDIV BX. It directs the microprocessor 300 to perform integer division of a 32-bit dividend contained in register pair DX:AX by a 16-bit divisor contained in register BX. Registers AX, BX, and DX are in an integer register file (not shown) in the integer execution unit of the microprocessor 300. In accordance with the technique for integer division described with reference to FIG. 3, the translator 320 decodes the integer divide instruction into a first sequence of micro instructions that directs the microprocessor 300 to load the operands into registers in the floating point register file 330 and to perform the division. This sequence is immediately followed by a second sequence of micro instructions that directs the microprocessor to determine if there is a divide overflow. The sequence to determine overflow could just as well precede the integer divide sequence, but for this illustration, it is provided subsequent to the integer divide sequence. Progression of the two sequences of micro instructions through the floating point unit of the microprocessor 300 is shown with respect to cycles of a pipeline clock. Instructions before and after instructions of interest are designated by "***." Voids, or slips in the pipeline are designated by "---." For clarity, FIG. 4 only depicts those stages of the microprocessor pipeline that are relevant to this discussion. Hence, the fetch stage and write back stage are not shown.

The integer divide micro instruction sequence appears as the first three micro instructions in the FP Register column of the table 400. They are designated as LD F1,DX:AX; LD F2,BX; and IDIV F1,F2. The overflow detection micro instruction sequence appears following the integer divide sequence. The overflow detection micro instructions are designated OV(1) F1,F2 through OV(5) F1,F2. The overflow detection micro instructions are represented as five general purpose micro instructions which direct the microprocessor 300 to determine if there is a divide overflow. For an unsigned dividend and divisor, the overflow detection micro instruction sequence would align the divisor and dividend in registers, and then compare the upper half of the dividend with the divisor. A jump instruction would follow, conditional upon a result of the comparison, such that an indication of divide overflow would be provided. Overflow detection for unsigned division is the most simple case. For division of signed numbers, the overflow detection micro instruction sequence would be much more complex because the dividend and divisor would have to be initially translated into forms that could be compared. Several different algorithms are used today to detect overflow for signed division, but they are all roughly equivalent. Whether five micro instructions or 50 micro instructions, the important aspect of the illustration provided in FIG. 4 is that there is a sequence of micro instructions dedicated to overflow detection, and this sequence must be executed by the floating point unit of the microprocessor 300 following execution of the integer divide micro instruction sequence.

During cycle 2, the integer divide instruction, IDIV BX proceeds through the translate stage of the pipeline. Therein, the translator 320 retrieves the integer divide instruction from the macro instruction buffer 312 and decodes it into the two micro instruction sequences described above.

During cycle 3, a first load micro instruction, LD F1,DX:AX, proceeds through the floating point register stage. The first load micro instruction directs the microprocessor 300 to load the contents of register pair DX:AX in the integer register file into register F1 in the floating point register file 330. Although not shown in FIG. 3, the microprocessor 300 provides a bus for transfer of data between the integer register file and the floating point register file 330. One skilled in the art will appreciate that inter-unit busses are common in today's microprocessors. Consequently, contents of register pair DX:AX, which are the dividend, are placed into register F1 of the floating point register file 330.

During cycle 4, the first load micro instruction proceeds through the floating point execute stage. Because it is a load instruction, its subtask was performed in the previous stage and no task is performed in the floating point execute stage. Also during cycle 4, a second load micro instruction LD F2,BX, proceeds through the floating point register stage. The second load micro instruction directs the microprocessor 300 to load the contents of register BX in the integer register file into register F2 in the floating point register file 330. Hence, contents of register BX, which are the divisor, are placed into register F2 of the floating point register file 330. Also during cycle 4, a next instruction, "***," proceeds through the translate stage.

During cycle 5, the second load micro instruction proceeds through the floating point execute stage. Also during cycle 5, an integer divide micro instruction, IDIV F1,F2, proceeds through the floating point register stage. The integer divide micro instruction directs the microprocessor 300 to perform an integer division of the dividend in register F1 by the divisor in register F2. Hence, contents of F1 and F2 are retrieved from the floating point register file 330 and are placed in registers 332 and 334, respectively.

During cycle 6, the integer divide micro instruction proceeds through the floating point execution stage. Therein, the dividend and divisor are retrieved by the floating point execution logic 340 from registers 332 and 334 and are provided to the divider 342. Because the divider 342 is a fixed-length divider, the dividend and divisor are justified as 64-bit operands. The divider 342 then executes the first of 64 divide cycles. Also during cycle 6, a first overflow detection micro instruction proceeds through the floating point register stage.

During cycle 7, the integer divide micro instruction executes the second of the 64 divide cycles in the divider 342. Because this micro instruction is still in the floating point execute stage, the interlock logic 350 inserts a slip into the pipeline to preclude following instructions from prematurely advancing. Because of the slip, the first overflow detection micro instruction remains in the floating point register stage. Moreover, the translator is precluded from providing any subsequent overflow detection micro instructions to the floating point register stage.

Since the divider 342 must execute a 64 divide cycles to perform the division, the interlock logic 350 continues to insert slips into the pipeline until the division is complete. The last of the 64 divide cycles completes during cycle 69. A result is placed in the result register 344.

Without overflow, as discussed with reference to FIG. 2, only 16 divide cycles are required to perform integer division of the 16-bit divisor into the 32-bit dividend. However, since the integer division is performed in the 64-bit divider 342 in the floating point unit, a 48 cycles are effectively wasted. This is a significant problem with using an existing floating point divider. Because the divider is designed to divide 64-bit floating point numbers, its use to divide integers less than 64-bits in size causes unnecessary delays in the execution of a program.

During cycle 70, the first overflow detection micro instruction proceeds through the floating point execute stage. Also during cycle 70, a second overflow detection micro instruction, OV(2) F1,F2, proceeds through the floating point register stage.

During cycle 71, the second overflow detection micro instruction proceeds through the floating point execute stage. Also during cycle 71, a third overflow detection micro instruction, OV(3) F1,F2, proceeds through the floating point register stage.

During cycle 72, the third overflow detection micro instruction proceeds through the floating point execute stage. Also during cycle 72, a fourth overflow detection micro instruction, OV(4) F1,F2, proceeds through the floating point register stage.

During cycle 73, the fourth overflow detection micro instruction proceeds through the floating point execute stage. Also during-cycle 73, a fifth overflow detection micro instruction, OV(5) F1,F2, proceeds through the floating point register stage.

During cycle 74, the fifth overflow detection micro instruction proceeds through the floating point execute stage. At this point, execution of the integer divide instruction through the floating point execute stage is complete. A result indicates whether there is an overflow or not.

As noted above, 48 cycles are essentially wasted in this example because the divider 342 performs all divisions as 64-bit divisions. In addition, five cycles are required to execute the sequence of micro instructions for overflow detection; more cycles are required to detect overflow if the integer divide is performed on signed numbers.

Use of the existing floating point divider 342 to perform integer division, nevertheless, achieves minimization of power and cost attributes in the design of a microprocessor. But, minimization of these attributes comes at the expense of speed. In the example of FIGS. 3 and 4, more than half of the pipeline cycles were consumed performing useless data manipulations. Furthermore, while overflow detection is required in an x86-compatible microprocessor, overflow detection, per se, is not an essential of pure integer division. One skilled in the art will appreciate that elimination of pipeline cycles in the execution of any micro instruction, without requiring additional hardware, is very desirable.

The present invention allows a microprocessor to execute only the number of divide cycles that are necessary to perform integer division, without requiring additional hardware. Moreover, the present invention executes overflow detection in parallel with the integer division so that unessential pipeline cycles are virtually eliminated from the execution path of an integer divide instruction.

Figure 5:
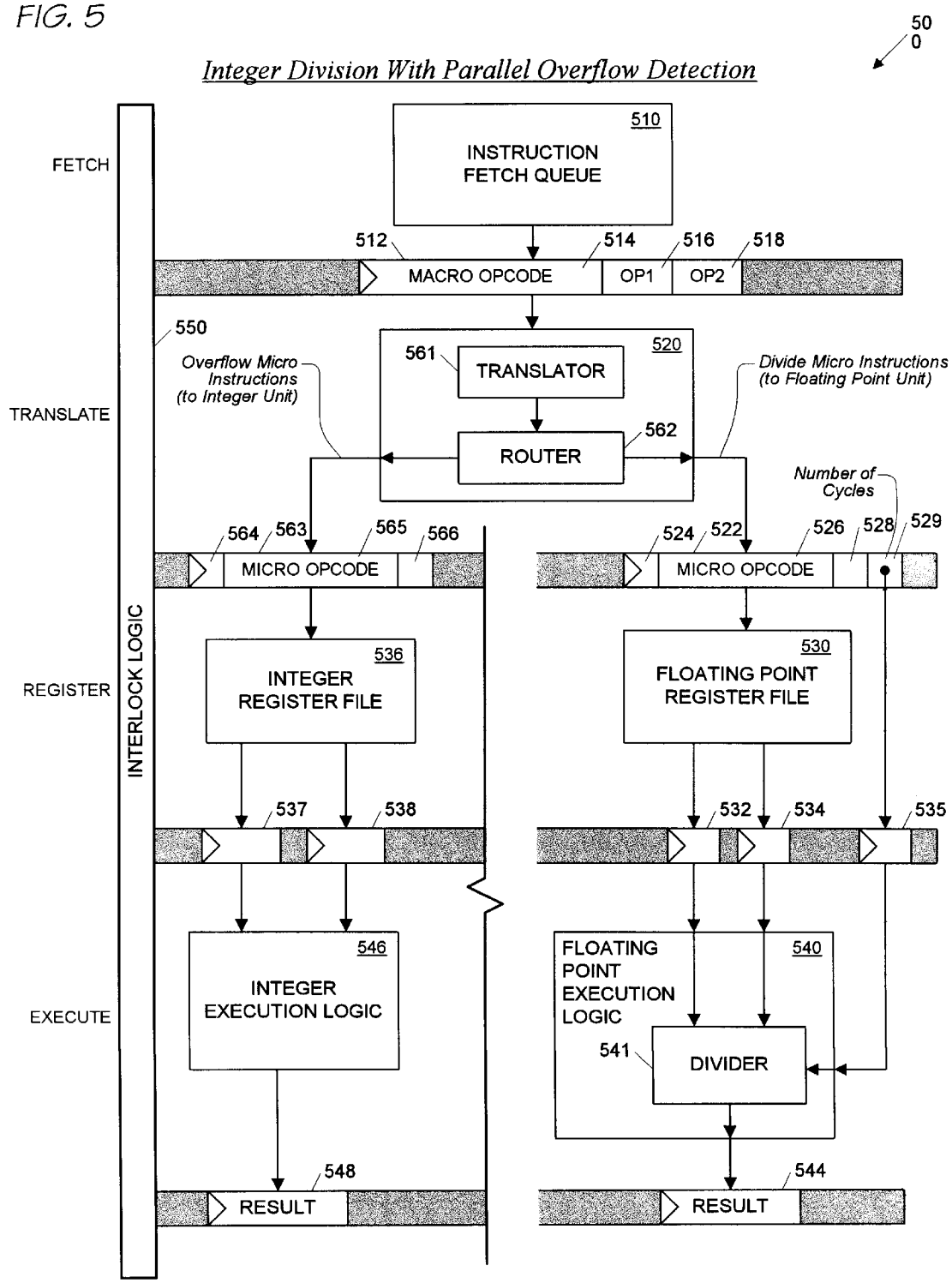
FIG. 5 is a block diagram of a microprocessor according to the present invention.

Now referring to FIG. 5, a block diagram of a microprocessor 500 according to the present invention is presented. For clarity, only those stages of the microprocessor 500 are shown that are relevant to this discussion. The block diagram shows four pipeline stages associated with execution of an integer divide instruction: fetch, translate, register, and execute. FIG. 5 also depicts both integer unit and floating point unit elements for the register and execute stages. The microprocessor 500 also includes interlock logic 550.

The fetch stage has an instruction fetch queue 510 connected to an instruction buffer 512. The translate stage has translation logic 520 that provides outputs to both an integer micro instruction buffer 563 and a floating point micro instruction buffer 522. The translation logic 520 includes a translator 561 and a router 562. The register stage has an integer register file 536 in the integer unit and a floating point register file 530 in the floating point unit. Outputs of the integer register file 536 are provided to first and second integer operand registers 537, 538. Similarly, outputs of the floating point register file 530 are provided to first and second floating point operand registers 532, 534. The integer execute stage includes integer execution logic 546, which receives inputs from the first and second integer operand registers 537, 538. Results from the integer execution logic 546 are placed in an integer result register 548 so that they may be written back in the integer write back stage. The floating point execute stage includes floating point execution logic 540, which receives inputs from the first and second floating point operand registers 532, 534. The floating point execution logic 540 includes a divider 541 and provides an output to a floating point result register 544. Contents of the result register 544 are provided to the floating point write back stage so that they may be written back into the floating point register file 530.

The divider 541, according to the present invention, is distinguished by an input from register 535 which specifies the number of divide cycles to perform during a division operation. In addition, upon execution of an integer divide instruction, the router 562 provides micro instructions associated with overflow detection to the integer unit rather than to the floating point unit. More specific operational details of the microprocessor 500 according to the present invention follow.

The instruction fetch queue 510 fetches macro instructions from memory (not shown) for execution by the microprocessor 500. The macro instructions are sequentially provided to the instruction buffer 512. The instruction buffer 512 has three fields: a macro opcode field 514, a first macro operand field 516, and a second macro operand field 518. In the case of an integer divide macro instruction, the macro opcode field 514 directs the microprocessor 500 to divide a dividend, which has been previously stored in an architecturally defined register, by a divisor. The divisor is prescribed by the first macro operand field 516 to be either in a register or in memory. Additionally, the macro opcode field 514 specifies the dividend/divisor size: word/byte, doubleword/word, or quadword/doubleword. The second macro operand field 518 does not contain an operand in the case of an integer divide instruction.

The translator 520 retrieves a macro instruction from the macro instruction buffer 512 and decodes it into an associated sequence of micro instructions. The router 562 directs micro instructions to either the integer unit or the floating point unit for execution. Micro instructions directed to the integer unit are provided to the integer micro instruction buffer 563. Micro instructions directed to the floating point unit are provided to the floating point micro instruction buffer 522. The integer unit micro instruction buffer 563 has three fields. Contents of a micro opcode field 565 direct the integer unit to perform a specific subtask. Operands are provided in first and second micro operand fields 564, 566. The floating point micro instruction buffer 522 has four fields. Contents of a micro opcode field 526 direct the floating point unit to perform a specific subtask. Operands are provided in first and second micro operand fields 524, 528. Furthermore, in the case of an integer divide instruction, contents of a cycles field 529 specify the number of divide cycles to execute in the divider 541. Like that described with reference to FIG. 3, for an integer divide instruction, the micro operand fields 524, 528 would first contain dividend and divisor data to load in the floating point register file 530 and would thereafter contain references to specific registers in the floating point register file 530 for execution of the division. Thus, micro instructions are provided to the integer and floating point units of the microprocessor 500.

If the integer micro opcode so directs, contents of the integer register file 536 are retrieved and placed into the first and second operand registers 537, 538. Contents of the floating point register file 530 are similarly retrieved and placed into the first and second operand registers 532, 534. In the case of an integer divide micro instruction, the divisor and dividend, placed into the floating point register file 530 by preceding load micro instructions, are retrieved and placed into the first and second operand registers 532, 534.

Although not shown in FIG. 5, the microprocessor 500 employs an inter-unit bus that allows contents of registers to be transferred between the integer unit and the floating point unit. Thus, the preceding load micro instructions can access the dividend and divisor in the integer register file 536 and place them into registers in the floating point register file 530. In addition, contents of the cycles field 529 are transferred to a cycles register 535.

The integer execution logic 546 retrieves the contents of registers 537 and 538 and executes the subtask specified by the integer micro opcode. Results from the integer execution logic 546 are placed in the integer result register 548. Likewise, the floating point execution logic 540 retrieves the contents of registers 532 and 534 and executes the subtask specified by the floating point micro opcode. In the case of an integer divide instruction, the divisor and dividend are retrieved from registers 332 and 334 and provided to the divider 541. Furthermore, contents of the cycles register 535 are provided to the divided 541. Following this, the divide operation is executed for the number of cycles specified by the contents of the cycles register 535: 32 cycles for quadword/doubleword division, 16 cycles for doubleword/word division, and 8 cycles for word/byte division. At the completion of the division, a result is placed in the result register 344.

In contrast to conventional techniques for integer division in a floating point unit, the present invention executes overflow detection micro instructions in parallel in the integer unit. The router 562 provides these micro instructions either immediately preceding or subsequent to integer division micro instructions. The integer division micro instructions are routed to the floating point unit and the overflow detection micro instructions are routed to the integer unit. Because the division operation in the floating point unit requires more than one cycle of the divider 541, the interlock logic 350 inserts slips into the floating point pipeline to preclude following instructions from prematurely advancing. However, overflow detection micro instructions may be routed to the integer unit for parallel execution while the division is being performed in the floating point unit. Execution of an x86 integer divide instruction is more clearly illustrated with reference to FIG. 6.

Figure 6:
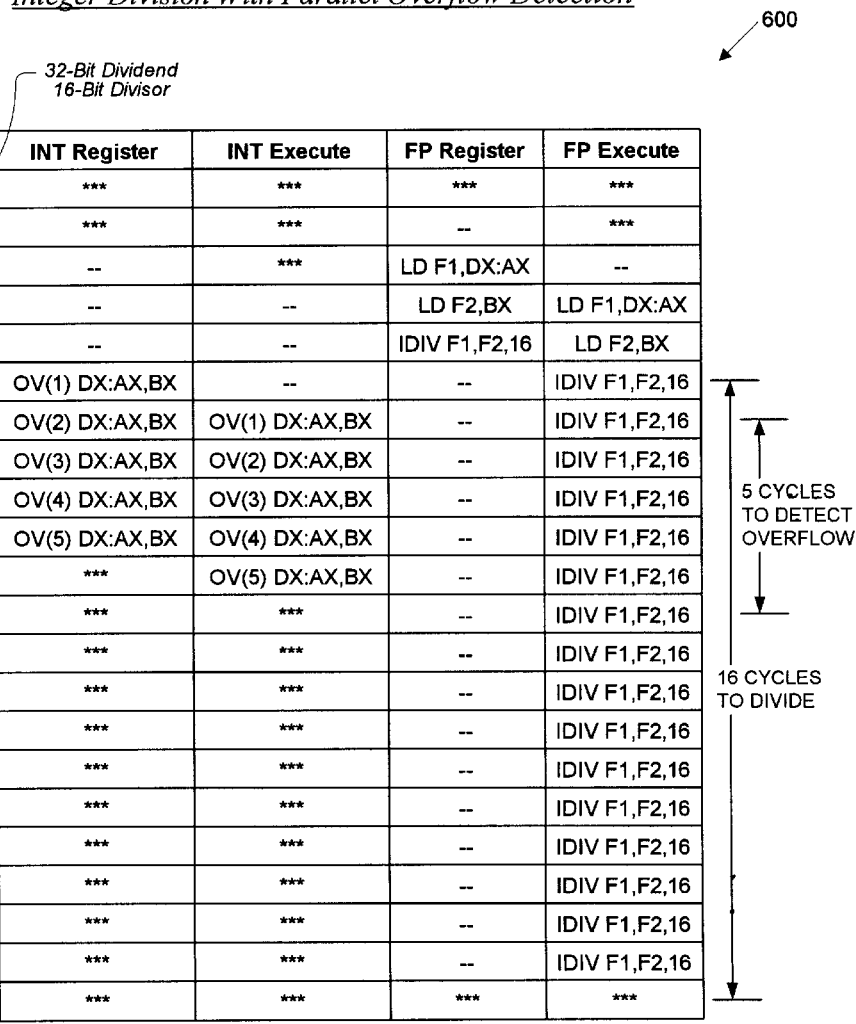
FIG. 6 is a table illustrating execution of an integer divide instruction by the microprocessor of FIG. 5.

FIG. 6 is a table 600 illustrating execution of an integer divide instruction by the microprocessor 500 according to the present invention. The integer divide instruction is designated by IDIV BX. It directs the microprocessor 500 to perform integer division of a 32-bit dividend contained in register pair DX:AX by a 16-bit divisor contained in register BX. Registers AX, BX, and DX are in the integer register file 536. Similar to the technique for integer division described with reference to FIG. 3, the translator 561 decodes the integer divide instruction into a first sequence of micro instructions that directs the microprocessor 500 to load the operands into registers in the floating point register file 530 and to perform the division. This sequence is immediately followed by a second sequence of micro instructions that directs the microprocessor to determine if there is a divide overflow. However, in contrast to the example of FIGS. 3 and 4, the router 562 according to the present invention provides the overflow detection micro instructions to the integer unit rather than the floating point unit. Progression of the two sequences of micro instructions through the microprocessor 500 is shown with respect to cycles of a pipeline clock. Instructions before and after instructions of interest are designated by "*." Voids, or slips in the pipeline are designated by "--." For clarity, FIG. 6** only depicts those stages of the microprocessor pipeline that are relevant to this discussion. Hence, the fetch stage and write back stage are not shown.

The integer divide micro instruction sequence appears as the three micro instructions in the FP Register column of the table 600. They are designated as LD F1,DX:AX; LD F2,BX; and IDIV F1,F2,16. The overflow detection micro instruction sequence appears as the five micro instructions in the INT Register column of the table 600. The overflow detection micro instructions are designated OV(1) DX:AX, BX through OV(5) DX:AX,BX. Rather than referencing registers in the floating point register file 530, as like micro instructions in the discussion with respect to FIG. 4, the overflow detection micro instructions according to the present invention reference registers in the integer register file 536.

During cycle 2, the integer divide instruction, IDIV BX proceeds through the translate stage of the pipeline. Therein, the translation logic 520 retrieves the integer divide instruction from the macro instruction buffer 512 and the translator 561 decodes it into the two micro instruction sequences described above.

During cycle 3, a first load micro instruction, LD F1,DX:AX, proceeds through the floating point register stage. The first load micro instruction directs the microprocessor 500 to load the contents of register pair DX:AX in the integer register file 536 into register F1 in the floating point register file 530. Consequently, contents of register pair DX:AX, which are the dividend, are placed into register F1 of the floating point register file 330 via the inter-unit bus (not shown).

During cycle 4, the first load micro instruction proceeds through the floating point execute stage. Because it is a load instruction, its subtask was performed in the previous stage and no task is performed in the floating point execute stage. Also during cycle 4, a second load micro instruction LD F2,BX, proceeds through the floating point register stage. The second load micro instruction directs the microprocessor 500 to load the contents of register BX in the integer register file 536 into register F2 in the floating point register file 530. Hence, contents of register BX, which are the divisor, are placed into register F2 of the floating point register file 530. Also during cycle 4, a next instruction, "***," proceeds through the translate stage.

During cycle 5, the second load micro instruction proceeds through the floating point execute stage. Also during cycle 5, an integer divide micro instruction, IDIV F1,F2,16 proceeds through the floating point register stage. The integer divide micro instruction directs the microprocessor 300 to perform an integer division of the dividend in register F1 by the divisor in register F2. The integer divide micro instruction also specifies 16 divide cycles to be performed by the divider 541. Hence, contents of F1 and F2 are retrieved from the floating point register file 530 and are placed in registers 532 and 534, respectively. In addition, contents of the cycles field 529 are provided to the cycles register 535.

During cycle 6, the integer divide micro instruction proceeds through the floating point execution stage. Therein, the dividend and divisor are retrieved by the floating point execution logic 540 from registers 532 and 534 and are provided to the divider 541. In addition, the contents of the cycles register 535 are provided to the divider 541. The divider 342 then executes the first of 16 divide cycles. Also during cycle 6, a first overflow detection micro instruction, OV(1) DX:AX,BX, proceeds through the floating point register stage. Therein, if prescribed by the first overflow detection micro instruction, contents of registers DX:AX and BX are retrieved and provided to the first and second integer operand registers 537, 538. Note that the first overflow detection micro instruction is being executed in the integer register stage in parallel to execution of the integer divide that is being performed in the floating point unit.

During cycle 7, the integer divide micro instruction executes the second of the 16 divide cycles in the divider 541. Because this micro instruction is still in the floating point execute stage, the interlock logic 550 inserts a slip into the floating point pipeline to preclude following floating point instructions from prematurely advancing. But because the slip is constrained to the floating point pipeline, the first overflow detection micro instruction is allowed to proceed through the integer execute stage. Also during cycle 7, a second overflow detection micro instruction, OV(2) DX:AX,BX, proceeds through the integer register stage.

Since the divider 541 must execute a 16 divide cycles to perform the division, the interlock logic 550 continues to insert slips into the pipeline until the division is complete. But, because the overflow detection micro instructions are allowed to proceed for execution through the integer unit, the overflow detection operation is complete by the time when a last divide cycle occurs. The last of the 16 divide cycles completes during cycle 21. A result is placed in the result register 344.

Figure 7:
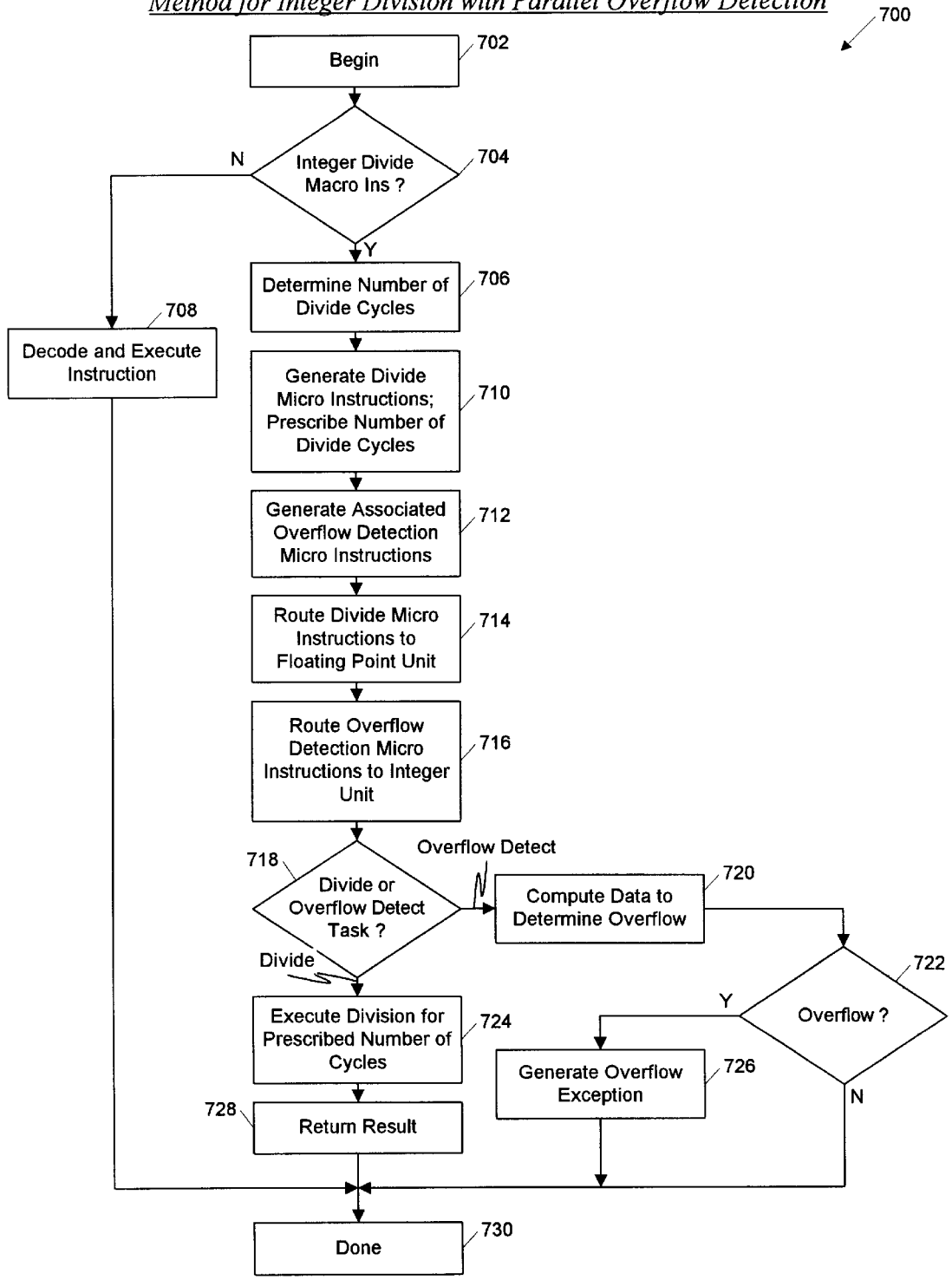
FIG. 7 is a flow chart illustrating a method for performing integer division according to the present invention.

Only 16 divide cycles are required to perform integer division of the 16-bit divisor into the 32-bit dividend. And all of the cycles are essential to the division; no cycles are wasted performing superfluous manipulation of data. The wasted-cycle problem, inherent to fixed-length dividers, is overcome by the present invention. Unnecessary delays in the execution of a program are avoided. In addition, five cycles are required to execute the sequence of micro instructions for overflow detection, but these cycles are consumed in parallel with the integer division, thereby optimizing use of existing hardware resources. Moreover, if an overflow is indeed detected, control logic (not shown) in the microprocessor 500 would stop execution of the integer divide micro instruction prior to completion, thus saving additional cycles. Use of the present invention to perform integer division achieves minimization of power and cost attributes in the design of a microprocessor, but, minimization of these attributes does not come at the expense of speed. In fact, integer division according to the present invention is performed in a fewer number of cycles than are required in comparable microprocessors. One skilled in the art will appreciate the significant savings in terms of speed, power, and cost, when the present invention is used in the performance of integer division. All unessential pipeline cycles are virtually eliminated from the execution path of an integer divide instruction Now referring to FIG. 7, a flow chart 700 is provided illustrating a method for performing integer division according to the present invention.

Flow begins at block 702 where an instruction is fetched from a macro instruction buffer in a microprocessor and provided to translation logic. Flow then proceeds to decision block 704.

At decision block 704, the instruction is evaluated to determine if it is an integer divide instruction. If so, then flow proceeds to block 706. If not, then flow proceeds to block 708.

At block 708, the instruction is decoded by the translation logic and executed by the microprocessor. Flow then proceeds to block 730.

At block 706, a translator determines how many divide cycles are required for execution of the integer division by evaluating the integer divide instruction. Flow then proceeds to block 710.

At block 710, the translator generates an integer divide micro instruction sequence that prescribes the required number of divide cycles. Flow then proceeds to block 712.

At block 712, the translator generates an overflow detection micro instruction sequence. Flow then proceeds to block 714.

At block 714, a router provides the integer divide micro instruction sequence to a floating point unit in the microprocessor. Flow then proceeds to block 716.

At block 716, the router provides the overflow detection micro instruction sequence to a parallel integer unit in the microprocessor. Flow then proceeds to decision block 718.

At decision block 718, micro instructions are evaluated in the parallel execution units of the microprocessor to determine if they prescribe division or overflow detection subtasks. If they prescribe division subtasks, then flow proceeds to block 724. If they prescribe overflow detection subtasks, then flow proceeds to block 720.

At block 724, integer division is performed for the prescribed number of divide cycles. Flow then proceeds to block 728.

At block 728, a result of the integer division is place in a result register. Flow then proceeds to block 730.

At block 720, overflow detection tasks such as number alignment and comparison of dividend to divisor are performed. Flow then proceeds to decision block 722.

At decision block 722, a result of the overflow detection task is evaluated to determine if there is a divide overflow. If not, then flow proceeds to block 730. If so, then flow proceeds to block 726.

At block 726, a signal indicating detection of a divide overflow is generated by the microprocessor. Flow then proceeds to block 730.

At block 730, the method completes.

Although the present invention and its objects, features, and advantages have been described in detail, other embodiments are encompassed by the invention. For example, the present invention has been particularly described in terms of an integer division operation being performed in a microprocessor having a floating point unit in parallel with an integer unit. The division is performed in a floating point divider while an associated overflow detection operation is performed by a parallel integer unit at the same time. However, it is entirely within the scope of the present invention to address microprocessor architectures having parallel integer units. In such a case, overflow detection can be performed in one integer unit while the integer divide is executed in a different integer unit.

In addition, the present invention has been characterized primarily with regard to performing integer division in a microprocessor. It is inconsequential, however, from what host platform the integer division is performed. Rather, the division can be performed upon any platform having parallel execution units capable of dividing binary data to include signal processors, embedded controllers, array processors, and industrial controllers.

Furthermore, parallel overflow detection in an integer unit is applicable in architectures that employ SRT division techniques. Although SRT division requires extensive hardware to implement, executing an overflow detection operation in parallel will still provide significant relative savings in execution time.

Moreover, the present invention has been described in terms of a microprocessor having parallel execution units residing on the same integrated circuit, however, implementation of the present invention is also applicable to microprocessors having floating point units that reside on a separate integrated circuit. These separate floating point units are also known as numeric coprocessors.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for performing integer division, comprising:
   translation logic, configured to receive an integer divide instruction, and configured to decode said integer divide instruction into an associated micro instruction sequence, comprising:
      an integer divide micro instruction sequence, prescribing the integer division of a dividend by a divisor; and
      an overflow detection micro instruction sequence, configured to determine if execution of said integer divide micro instruction sequence will result in an overflow;
   floating point execution logic, coupled to said translation logic, configured to receive and execute said integer divide micro instruction sequence; and
   integer execution logic, coupled to said translation logic, configured to receive and execute said overflow detection micro instruction sequence;
   wherein said integer execution logic and said floating point execution logic execute said overflow detection micro instruction sequence and said integer divide micro instruction sequence concurrently.

2. The microprocessor as recited in claim 1, wherein said integer divide instruction prescribes said divisor being N bits in length and said dividend being 2N bits in length.

3. The microprocessor as recited in claim 2, wherein said overflow results if the integer division would generate a quotient greater than N bits in length.

4. The microprocessor as recited in claim 1, wherein said translation logic comprises:

a translator, configured to generate said integer divide micro instruction sequence and said overflow detection micro instruction sequence; and routing logic, coupled to said translator, configured to provide said integer divide micro instruction sequence to said floating point logic and said overflow detection micro instruction sequence to said integer execution logic.

5. The microprocessor as recited in claim 4, wherein said translator comprises a control ROM.

6. The microprocessor as recited in claim 1, wherein said integer divide micro instruction sequence comprises a cycles field, specifying a number of divide cycles to be performed by said floating point execution logic.

7. The microprocessor as recited in claim 6, wherein said cycles field is specified in accordance with a number of bits in said divisor.

8. The microprocessor as recited in claim 7, wherein, if said divisor is a 16-bit unsigned integer, then said cycles field specifies 16 divide cycles.

9. The microprocessor as recited in claim 7, wherein said floating point execution logic executes the integer division for said number of divide cycles specified by said cycles field.

10. The microprocessor as recited in claim 1, wherein said integer execution logic comprises:

an overflow indication, signifying a result of execution of said overflow detection micro instruction sequence.

11. The microprocessor as recited in claim 1, wherein said integer execution logic and said floating point execution logic are parallel execution units in the microprocessor, said parallel execution units being capable of independently executing micro instructions at the same time.

12. An apparatus in a microprocessor for executing an integer division, comprising:

translation logic, configured to receive an integer divide instruction, and to generate an associated micro instruction sequence that directs the microprocessor to perform the integer division and to detect an overflow condition, said translation logic comprising:

routing logic, configured to route said micro instructions within said associated micro instruction sequence;

floating point execution logic, coupled to said translation logic, configured to receive and execute micro instructions prescribing the integer division; and integer execution logic, coupled to said translation logic, configured to receive and execute micro instructions prescribing detection of said overflow condition.

13. The apparatus as recited in claim 12, wherein said associated micro instruction sequence comprises:

an integer divide micro instruction sequence, prescribing the integer division of a dividend having 2N bits by a divisor having N bits; and an overflow detection micro instruction sequence, configured to determine if execution of said integer divide micro instruction sequence would result in said overflow condition;

wherein said routing logic routes said integer divide micro instruction sequence to said integer execution logic and said overflow detection micro instruction sequence to said floating point execution logic for concurrent execution.

14. The apparatus as recited in claim 13, wherein said overflow condition results if the integer division would generate a quotient greater than N bits in length.

15. The apparatus as recited in claim 13, wherein said translation logic further comprises:

a translator, configured to decode said integer divide instruction into said integer divide micro instruction sequence and said overflow detection micro instruction sequence.

16. The apparatus as recited in claim 13, wherein said integer divide micro instruction sequence comprises a cycles field, specifying a number of divide cycles to be performed by said floating point execution logic.

17. The apparatus as recited in claim 16, wherein said cycles field is specified in accordance with a number of bits in said divisor.

18. The apparatus as recited in claim 17, wherein, if said divisor is a 32-bit unsigned integer, then said cycles field specifies 32 divide cycles.

19. The apparatus as recited in claim 17, wherein said floating point execution logic executes the integer division for said number of divide cycles specified by said cycles field.

20. The apparatus as recited in claim 13, wherein said integer execution logic comprises:

an overflow indication, signifying a result of execution of said overflow detection micro instruction sequence.

21. An apparatus in a microprocessor for executing an integer divide instruction, the integer divide instruction prescribing a dividend and a divisor, the apparatus comprising:

a translator, configured to decode the integer divide instruction into an associated micro instruction sequence, said associated micro instruction sequence comprising:

an integer divide micro instruction sequence, specifying a number of divide cycles according to the size of the divisor; and an overflow detection micro instruction sequence, configured to determine if execution of said integer divide micro instruction sequence will result in an overflow;

routing logic, coupled to said translator, configured to receive said integer divide micro instruction sequence and said overflow detection micro instruction sequence, and for routing said sequences;

floating point execution logic, coupled to said routing logic, configured to receive said integer divide micro instruction sequence, and to perform the integer division for said number of divide cycles; and integer execution logic, coupled to said routing logic, configured to receive and execute said overflow detection micro instruction sequence.

22. The apparatus as recited in claim 21, wherein said integer divide micro instruction sequence comprises:

a cycles field, containing said number of divide cycles.

23. The apparatus as recited in claim 21, wherein said routing logic provides said integer divide micro instruction sequence to said integer execution logic and said overflow detection micro instruction sequence to said floating point execution logic, whereby said integer divide micro instruction sequence and said overflow detection micro instruction sequence are concurrently executed.

24. The apparatus as recited in claim 21, wherein said integer execution logic comprises:

an overflow indication, signifying a result of execution of said overflow detection micro instruction sequence.

25. A method for performing integer division in a microprocessor having parallel execution units, comprising:
   a) decoding an integer divide instruction into an associated micro instruction sequence, the associated micro instruction sequence having an integer divide micro instruction sequence and an overflow detection micro instruction sequence, wherein the integer divide micro instruction sequence specifies a number of divide cycles according to the size of a divisor; and
   b) concurrently executing the overflow detection micro instruction sequence and the integer divide micro instruction sequence within the parallel execution units.

26. The method as recited in claim 25, further comprising:
   routing the integer divide micro instruction sequence to a floating point execution unit and the overflow detection micro instruction sequence to an integer unit.

27. The method as recited in claim 26, wherein said executing comprises:
   performing the integer division in the floating point unit for the number of divide cycles specified in the integer divide micro instruction sequence; and
   determining if performance of the integer division would result in a quotient having a number of bits greater than that of the divisor.

28. The method as recited in claim 27, wherein said determining comprises:
   indicating a divide overflow condition if said determining detects that performance of the integer division would result in a quotient having a number of bits greater than that of the divisor.

* * * * *